June 18, 1968 S. E. JAMISON 3,389,206
ART OF PRODUCING A POLYMERIC FILM OR THE LIKE
Filed June 16, 1965 2 Sheets-Sheet 1

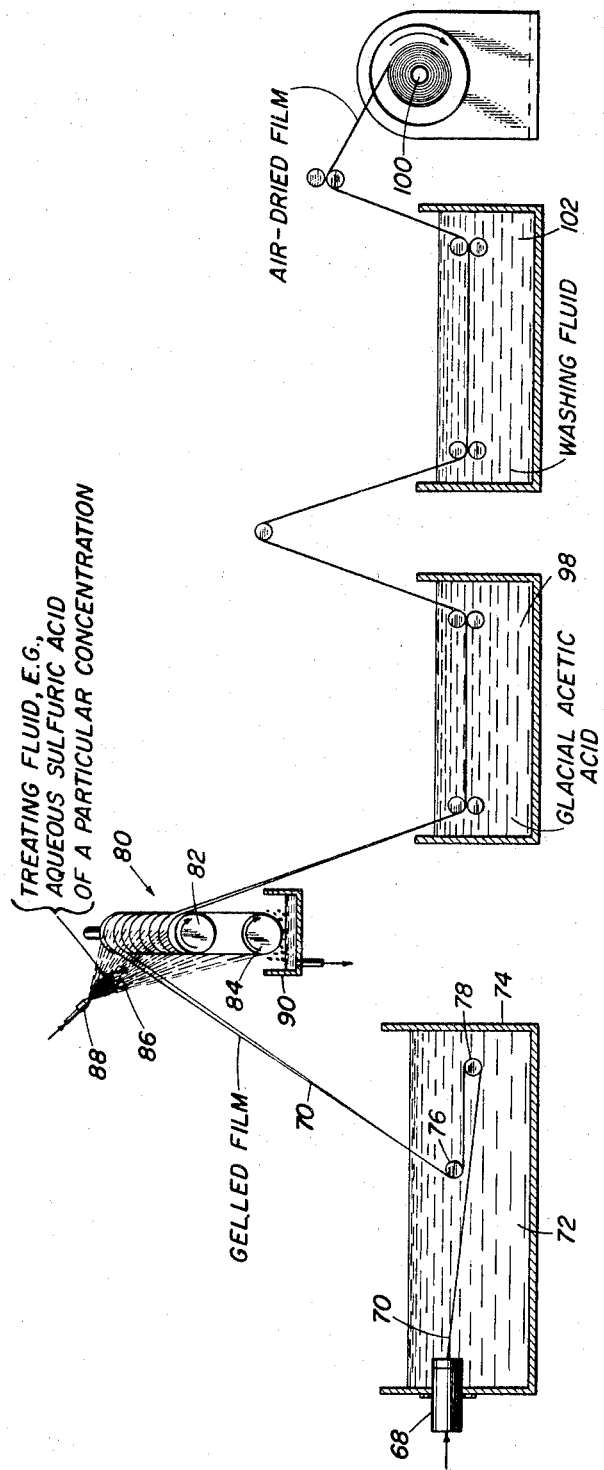

United States Patent Office 3,389,206
Patented June 18, 1968

3,389,206
ART OF PRODUCING A POLYMERIC
FILM OR THE LIKE
Saunders E. Jamison, Summit, N.J., assignor to Celanese
Corporation, a corporation of Delaware
Filed June 16, 1965, Ser. No. 464,423
12 Claims. (Cl. 264—203)

ABSTRACT OF THE DISCLOSURE

A method of forming a film from a difficultly-meltable, sulfuric acid-soluble, film-forming polymer wherein transparency is imparted to the water-washed and dried film by treating the continuously moving gelled film, after leaving the coagulating bath and while it is passing over a film-advancing device, e.g., skewed rolls, with a certain specified concentration of $H_2SO_4$, after which the treated film is passed through a bath of (or otherwise contacted with) glacial acetic acid. This method can be carried out in the presence or absence of tensioning means in the coagulating bath.

---

Figure 1:
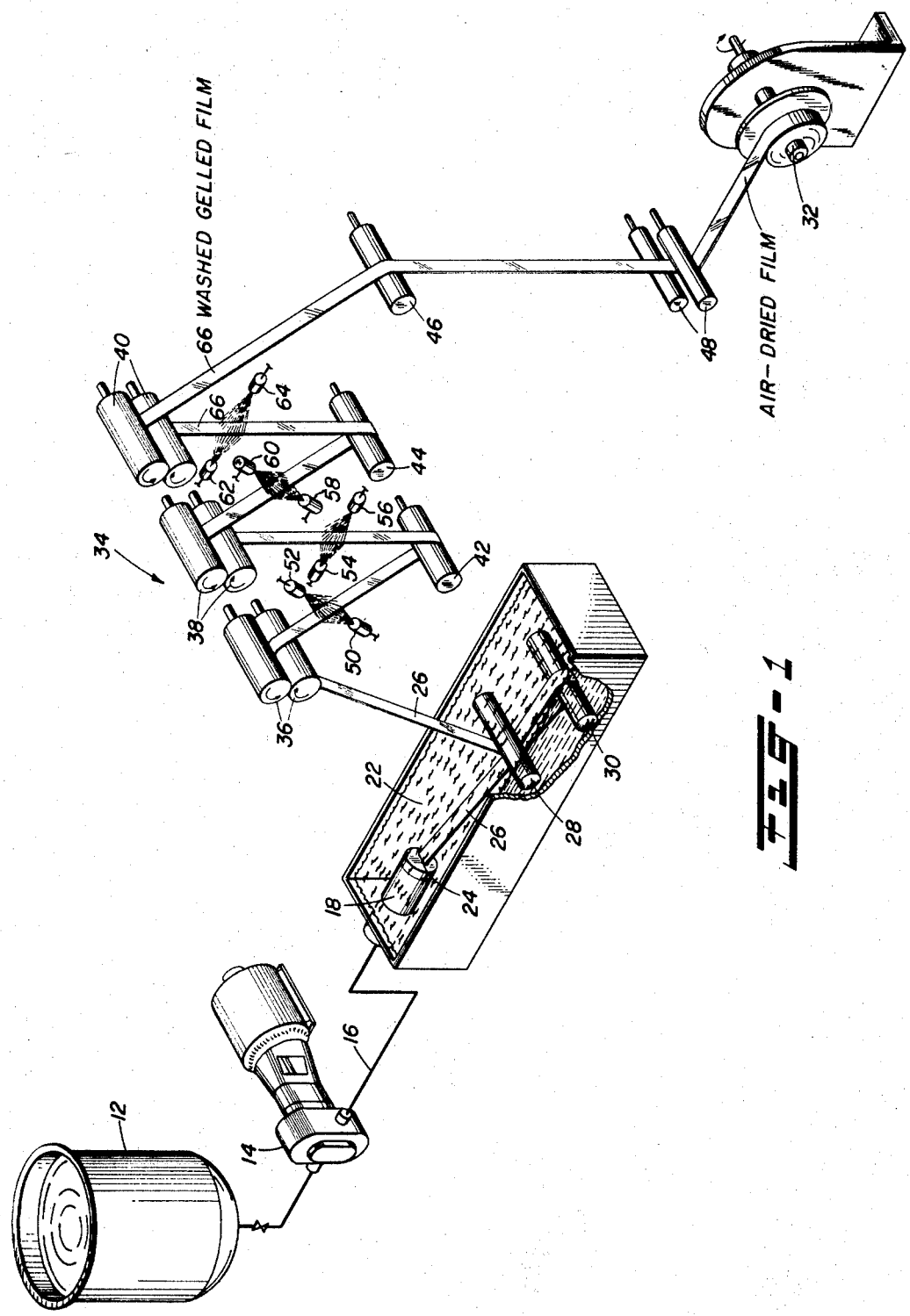

This invention relates broadly to the art of producing flat articles such as a film, ribbon, tape, band or other flat material (hereafter for purpose of simplicity and brevity collectively designated as a "film") from a film-forming (film-formable) polymer. More particularly, it is concerned with a method of forming a film from a "difficultly-meltable", film-forming polymer. The invention is especially applicable in the production of transparent films from such polymers, which include difficultly-meltable, film-forming condensation polymers having repeating amide groups as a part of the polymer molecule, e.g., a poly(polymethylene)amide such as polyhexamethylene terephthalamide.

By "difficultly-meltable" polymers as used herein are meant polymers that cannot be shaped easily using melt-extrusion techniques because they tend to degrade materially and/or to polymerize further to a useless, infusible mass when heated sufficiently to melt them.

It was known prior to the present invention that polymers to which this invention is applicable could be formed into shaped articles, specifically filaments or fibers. See, for example, U.S. Patents 3,154,512 and –612 of Parczewski; 3,154,609, Cipriani; 3,154,610, Denyes; and 3,154,614, Epstein et al., each dated Oct. 27, 1964. However, none of these patents (nor any other prior art to the best of my knowledge and belief) teaches or suggests the method involved in the instant invention for making films, more particularly transparent films, from the aforementioned polymers.

The novel features of my invention are set forth in the appended claims. The invention, itself, however, will be more readily understood from the following description taken in connection with the accompanying drawing, which is illustrative of the invention, and wherein FIG. 1 illustrates schematically one embodiment of the invention; and FIG. 2 illustrates schematically another embodiment of the invention.

Broadly described, the instant invention provides a method of forming a film, more particularly a transparent film (i.e., a film wherein some or all portions of the film are transparent), from a difficultly-meltable, film-forming polymer by extruding a solvent solution of the polymer through a slotted opening into a liquid coagulating bath ("spin" bath) in which the said polymer is insoluble thereby to form a gelled film of the polymer, which film is at least partly non-transparent after drying (i.e., after conversion to solid or non-gelled state). The gelled film after leaving the extrusion head is subjected to at least one physical treatment that renders the said film transparent after drying. This physical treatment, which hereafter will be described, is other than the continuous physical treatment that the freshly-formed film receives during its contact with the liquid in the coagulating bath during its passage through said bath from the point of formation of the film at the extrusion head to the point where it leaves the bath. Thereafter the gelled film is dried. Drying may take the form of a positive action such as subjecting the tensioned or untensioned film to an elevated temperature in a drying zone, or the film may be allowed to dry at room temperature either in tensioned or untensioned state.

The method of this invention may be utilized in producing films from film-forming polymers such as those having repeating —CONR— groups, where R represents hydrogen or a monovalent organic radical, e.g., a hydrocarbon radical such as a lower-alkyl radical. Such polymers include the polyamides proper, e.g., the nylons, wherein the —NRCO— groups art attached to carbon atoms on each side, the polyurethanes which contain repeating —NRCOO— groups, the polyureas which contain repeating —RNCONR— groups, and similar condensation polymers. There is no particular advantage in applying the method of this invention to many of such polymers, more particularly those which are adapted to be melt-extruded through a slot to form films. However, in the case of the aforementioned difficultly-meltable polymers, there has been the serious problem of developing practical means for making films therefrom, and especially transparent films. Thus, the method of the present invention is most useful when applied to high-melting polymers, more particularly those melting above 210° C. and especially above 275° C.; polyurethanes and polyureas melting above 179° C., especially above 210° C.; and, in general, polymers having cyclic groups, e.g., meta-or para-phenylene, cycloalkylene groups such as 1,4 - cyclohexylene and/or heterocyclic groups such as piperaxylene or an alkyl-substituted piperaxylene group, e.g., 2-(lower-alkyl) piperaxylene such as 2-methylpiperaxylene or 2,5-di-lower-alkyl)piperaxylene such as 2,5-dimethylpiperaxylene, as a integral part of the polymer molecule.

Some contemplated polyamides are those, for example, which have repeating structural units of the formula

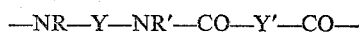

—NR—Y—NR'—CO—Y'—CO— that result from the condensation of a dicarboxylic acid or a derivative thereof, e.g., a salt, acyl halide, or ester of such an acid, with a diamine, wherein the R's, which may be the same or different, are hydrogen or monovalent organic radicals, e.g., lower alkyl such as methyl or ethyl, and the Y's, which also may be the same or different, are divalent organic radicals such as alkylene, e.g., ethylene, tetramethylene and hexamethylene, arylene such as para- and meta-phenylene, para- and meta-xylylene, and para- and meta-diethylene benzene, cycloalkylene such as 1,4-cyclohexylene and divalent heterocyclic radicals such as those derived from piperazine, and monoalkyl- and di-alkylpiperazines, e.g., 2-methyl- and 2,5-dimethylpiperazines and 2-ethyl- and 2,5-diethylpiperazines, wherein the open bonds are attached to the nitrogen atoms, and wherein the chemical structure of the polymer and/or the polymerization technique used is such that a relatively high-melting polymer is obtained.

An important group of polyamides within the above group and to which the present invention is especially applicable, includes those in which Y and/or Y' is or contains a para- or meta-phenylene radical or a 1,4-cyclohexylene radical. Particularly important are condensation products of a diamine and terephthalic acid or a derivative of terephthalic acid, e.g., terephthalyl chloride or a dialkyl terephthalate. Some specific polymers within this latter group are poly(polymethylene)terephthalamides wherein the polymethylene groups contain, for example, from 2 to 10 carbon atoms, inclusive, e.g., polyhexamethylene terephthalamide, polyoctamethylene terephthalamide, polytetramethylene terephthalamide, polyethylene terephthalamide, and polypiperaxylene terephthalamide. Other polyterephthalamides are poly(o-, m-, and p-phenylene)terephthalamides, poly(o-, m-, and p-xylylene)terephthalamides and poly(o-, m-, and p-diethylene-phenylene)terephthalamides, the latter produced, for example, by condensing an ester-forming derivative of terephthalic acid with para-bis(beta-aminoethyl)benzene.

The method of this invention is applicable to the production of films of high-melting polyamides of aromatic acids other than terephthalic acid, e.g., of isophthalic acid, 2,6 - naphthalenedicarboxylic acid, p,p' - dicarboxydiphenyl, (p,p' - dicarboxydiphenyl)methane, phenylenediacetic acid, phenylenedipropionic acid, and phenylenedibutyric acid. The diamine moieties of these other aromatic carboxylic acids may be the same as in the aforementioned polyterephthalamides. Illustrative, then, of polyamides other than the polyterephthalamides are the polyisophthalamides, specifically polyethylene isophthalamide. The process of the present invention also may be employed in making films from high-melting (difficultly-meltable) polyamides resulting from a condensation reaction between (a) alkylene dicarboxylic acids such as adipic acid and (b) cyclic diamines such as p-xylene diamine and p-bis-amino-ethylbenzene.

Also contemplated are high-melting autocondensation polymers, e.g., melting above 275° C., of an aminocarboxylic acid or a lactam or other derivative of such an acid, which polymers have repeating structural units of the formula —NR—Y—CO— wherein R and Y are as defined above. Some specific polyamides melting above 275° C. within this group are polymers of the following: 1 - carboxymethyl - 4 - aminocyclohexane or its lactam, 1 - carboxy - 4 - aminocyclohexane or its lactam and 1-carboxymethyl-3-aminocyclopentane or its lactam.

The polyurethanes contemplated are polymers having repeating structural units of the formula

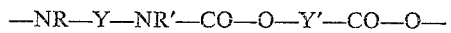

—NR—Y—NR'—CO—O—Y'—CO—O— resulting, for example, from the condensation of a diisocyanate with a dihydric alcohol or phenol or the condensation of a diamine with a bis(chloroformate) of a dihydric alcohol or phenol, where the R's and Y's are as described above in connection with the polyamides, and the chemical structure of the polymer and/or the polymerization techniques used are such that a polymer melting above 179° C., preferably above 210° C., is obtained. Particularly useful are polyurethanes prepared from dihydric alcohols or phenols containing a meta- or para-phenylene or a 1,4-cyclohexylene radical. Some specific polyurethanes which may be used are the condensation product of piperazine with the bis(chloroformate) of bis(p-hydroxyphenyl)propane-2,2, the condensation product of piperazine with the bis(chloroformate) of hydroquinone and the condensation product of tetramethylene diamine with the bis(chloroformate) of butanediol-1,4, each of which has a melting point above 210° C.

Polyureas which may be formed into useful films in accordance with this invention have repeating structural units of the formula

—CO—NR—Y—NR—CO—NY'—Y'—NR— wherein the R's and Y's are as defined above. They may be synthesized, for example, by the addition of a diisocyanate to a diamine, the condensation of a diurethane with a diamine, the condensation of a carbon oxyhalide such as phosgene with a diamine, or by heating an alpha,beta-diurea with a diamine, the chemical structure of the polymer and/or the polymerization technique being such that a polymer melting above 179° C., preferably above 210° C., is obtained. Some specific polyureas contemplated are those obtained from the reaction of hexamethylene diisocyanate with hexamethylene diamine and from the reaction of m-phenylene diisocyanate with m-phenylene diamine, each of which polyurea melts above 210° C.

Referring now to FIG. 1 showing schematically one embodiment of the invention, an extrudable film-forming composition or "dope" in supply vessel 12 is pumped by means of pump 14 through conduit 16 to extrusion head 18, which is detachably fixed at one end of the vessel that holds the liquid coagulant 22. The supply vessel is preferably provided with heating means such as heating coils, jacket or equivalent means for heating and maintaining the dope at or near its extrusion temperature. Normally this vessel is a closed vessel, and means are provided for maintaining the dope therein under an atmosphere of an inert gas, e.g., argon, helium, nitrogen, etc.

Reference is made to the disclosures in the aforementioned patents concerning solvents that are useful in dissolving the polymer and how the dissolution is effected, and which by this cross-reference are made a part of the disclosure of the instant application. Such solvents include, for example, (a) a solvent comprising at least 70% by weight of antimony trichloride and formic acid or acetic acid as a diluent in an amount up to 30% by weight of the solvent (U.S. Patent 3,154,512); (b) a solvent containing over 85% by weight of phosphoric acid (U.S. Patent 3,154,612); and (c) a solvent comprising concentrated sulfuric acid (U.S. Patents 3,154,609 and -612).

The polymer-containing, film-forming, solvent solutions or dopes which are formed and extruded to produce a film in practicing this invention are preferably prepared by dissolving the polymer in sulfuric acid containing at least 70%, more particularly at least 75%, by weight of $H_2SO_4$. Preferably, too, the sulfuric acid is concentrated sulfuric acid containing 95 to 100% by weight of $H_2SO_4$. Fuming sulfuric acid, e.g., such acid containing up to 6 or 7% by weight or even higher of free $SO_3$, also may be employed. A suitable concentration of the polymer in the dope is, for example, in the range of 5 to 30% by weight.

Preferably the film-forming dope is filtered and deaerated before use. A filter (not shown) may be introduced at any suitable point in line 16, e.g., after the line leaves pump 14 to further insure the removal of traces of impurities, or such a filter may be located at the rear end, or be a part, of the extrusion device.

In operation the dope is forced through the slot 24 in the extrusion head 18 to form the gelled (i.e., wet gelled) film 26 when the dope contacts the liquid coagulant 22.

The liquid coagulant is a liquid in which the solvent used to dissolve the polymer is soluble but in which the polymer is insoluble. Usually it is desirable to employ, as the liquid coagulant, a liquid containing a lower concentration of the same solvating agent used in making the polymer solution or dope, said lower concentration being such that the solution of the polymer is coagulated into a gelled film. Thus, when the solvent in which the polymer is dissolved is sulfuric acid containing at least 70%, or at least 75%, by weight of $H_2SO_4$, the liquid coagulating bath is preferably aqueous sulfuric acid having a concentration of $H_2SO_4$ lower than that of the sulfuric acid in which the polymer is dissolved and, as aforementioned, such that the solution of the polymer is coagulated into the form of a gelled film.

When using the preferred liquid coagulant, i.e., aqueous sulfuric acid, the concentration of sulfuric acid in said liquid coagulant may be varied considerably depending on various modifications of the process, and more particularly upon the particular technique employed to obtain a film that is transparent after drying. However, such concentration, especially when making a film of a polyterephthalamide such as polyhexamethylene terephthalamide, in many cases will be below 55% by weight and, in some cases, not higher than about 50% by weight, e.g., when the gelled film immediately after removal from the coagulating bath is treated (see FIG. 2), as by spraying, immersion, etc., with a treating agent such as sulfuric acid having a concentration of $H_2SO_4$ within the range of from 54 to 58%, preferably from 55 to 57%, by weight thereof. As indicated above, the concentration of sulfuric acid in the liquid coagulant may be below 55% by weight $H_2SO_4$, e.g., from 0% to 50%. By "0%" it is meant that water alone is the liquid coagulant into which the sulfuric acid solution of the polymer is extruded to form the gelled film, the liquid coagulant then becoming acidified with $H_2SO_4$ as it extracts this acid from the gelled film during passage of the latter through the liquid coagulating bath.

Lower sulfuric acid concentrations of the liquid coagulant, for example below about 40% $H_2SO_4$, more particularly within the range of from 0% to 30 to 35% $H_2SO_4$, are conducive to the formation of thicker films if and when desired. By using a coagulating bath having lower $H_2SO_4$ concentrations, one may obtain thicker, opaque films that then may be clarified by an after-treatment such as is illustrated in FIG. 2 and hereafter more fully described.

A sulfuric acid concentration within the range of from about 40% to about 45% $H_2SO_4$ facilitates the direct formation of transparent films using the technique illustrated in FIG. 1 and now being specifically described with reference to that figure.

The temperature of the coagulating bath may be varied as desired or as may be required depending, for example, upon the particular polymer employed, the particular solvent used to dissolve the polymer, the particular liquid coagulant used, the extrusion rate, the particular properties desired in the finished film, and other influencing factors. Thus the bath temperature may range, for example, from room temperature (20°–30° C.) to about 100° C., but preferably is within the range of from about 40° C. to about 60° C. When necessary, heating coils (not shown) are provided in order to maintain the coagulating bath at the desired temperature above ambient temperature.

In the embodiment of the invention illustrated in FIG. 1, the gelled film 26 is continuously pulled through the coagulating bath. However, while in the coagulating bath it is brought into contact with at least two smooth, curved surfaces which are so positioned with respect to each other and the direction of travel of the moving film that the film is caused to so reverse its direction that its angle of bend is at least about 135°. Thus, the film's angle of bend or snubbing angle may be within the range of from about 135° to about 225°, more particularly from about 165° to about 195°, and specifically about 180°. There is no known upper limit for this angle of bend except that which may be set by practical spinning difficulties in a particular situation.

The smooth, curved surfaces to which reference has been made in the preceding paragraph may take the form of two rods or pins 28 and 30 that are so positioned as to provide the aforementioned angle of bend. Such rods or pins may be formed of, or at least surfaced with, a smooth, hard, wear-resistant material such as those that are commercially available under such names as Alsimag (and which is understood to be an aluminum magnesium silicate), Heanium (mainly $Al_2O_3$), and the like.

The minimum angle of bend of at least about 135° (i.e., for the same diameter of the snubbing pin or rod) is critical in practicing this embodiment of the instant invention. For example, when the angle of bend is 45° or 90°, and with the polymer solution and operating conditions otherwise the same, the dried film is opaque or cloudy instead of having the clarity and transparency that characterize the films of this embodiment of the invention. I am unable to state with certainty the reason for this unexpected and unobvious result. One possible explanation is that under the specified conditions the degree of tension (for the same rod or pin diameter) applied to the film during its passage over the smooth, curved surfaces permits a desired or necessary structural change or shift in the arrangement of the polymer molecules whereby a transparent film is obtained after the thusly modified film has been dried.

In this connection the following brief discussion as to what is meant by "angle of bend" also sometimes designated as "degree of snubbing") may aid in better understanding this embodiment of the invention.

If rods or pins 28 and 30 were so disposed in the coagulating bath that there would be no change in the direction of travel of the moving film, in which case the film would be passing straight through the bath, the amount or degree of tension exerted on the moving film (for the same rod or pin diameter) would be minimal. The position of the rods would then be equivalent to an angle of bend of zero degrees since there would be no change in the direction of travel of the film. However, if the tensioning means (i.e., rods or pins 28 and 30) were positioned in the bath so as to define a line that is at right angles (substantially right angles) to the direction of film travel prior to its passing rod 28 and subsequent to its passing rod 30, the angle of bend of the film as it passes about the rods would be equivalent to 90° (substantially 90°); and the amount of tension (for the same rod or pin diameter) imparted by the thusly positioned rods would be somewhat greater than when the angle of bend is 0°. In practicing this embodiment of my invention the rods 28 and 30 are positioned so that the film is caused to reverse its direction at least about 1½ times, e.g., from about 1½ to about 2½ times, and preferably about 2 times, so that the angle of bend corresponds to from about 135° to about 225°, preferably approximately 180°. As a result, the amount of tension imposed upon the film as it passes the thusly positioned rods is still greater than that in the two situations discussed previously. However, if rods 28 and 30 were positioned in the bath so that the film is caused to reverse its position three times, the angle of bend as it passes about the rods corresponds to 270°, so that the amount or degree of tension imposed upon the film (for the same rod or pin diameter) would be the highest of all that results from the three situations just described.

It is not essential that the rods 28 and 30 be positioned horizontally in the coagulating bath as indicated in FIG. 1. Thus, they may be disposed in the coagulating bath so that they extend vertically downwardly into the bath of liquid coagulant. Since the amount of tension imposed upon the film (for the same rod or pin diameter) is dependent upon the relative orientation of the rods, it is desirable to mount both rods upon a common head (not shown), for example by using a fork mechanism for mounting a pair of rods as is shown in my copending application Ser. No. 233,827, filed Oct. 29, 1962, assigned to the same assignee as the present invention, and now abandoned. Thus, by merely rotating a shaft to which is attached a mounting head carrying the two rods in spaced relationship, the said two rods can be readily disposed at the desired angular position with respect to the direction of travel of the gelled film 26.

In connection with the foregoing discussion with regard to the snubbing angle or angle of bend of the moving film as it passes over the snubbing pins or rods 28 and 30, it may be further mentioned that the amount or degree of tension exerted by such rods is proportional to the friction imposed upon the moving film and that the latter, in turn, depends upon the contact distance. Hence, the diameter of the snubbing pin or rod is important. In the technique herein described with reference to the angle of bend or snubbing angle of the moving film, the diameter of the snubbing pin or rod over which the film was passed was ¼ inch. Consequently, it is to be understood that in the description herein given with reference to the angle of bend of the moving film, and in the appended claims, the stated angle of bend provides friction or tension corresponding to that obtained when the moving film is passed, at the specified angle of bend, over a rod or pin ¼ inch in diameter.

Also, it is not essential that one use stationary rods or pins in the coagulating bath as tension-inducing members positioned to provide the desired angle of bend. For example, a pair of positively driven rotating rolls may be utilized. Such rolls are each rotated at the same speed, which speed is less than that of the take-up roll 32. Accordingly, by winding the gelled film about each of the rotating rolls in the coagulating bath and about the take-up roll 32, more or less tension (as desired or as conditions may require) can be imposed upon the film while it is in the coagulating bath. The amount of induced tension can be controlled by varying the differential in speed of rotation between the pair of such rollers in the bath of liquid coagulant and the take-up roll 32.

With further reference to FIG. 1 there is shown by way of illustration one means of removing liquid coagulant from the wet gelled film, but it is to be understood that any suitable washing or other coagulable-removal means may be employed.

The illustrated washing means, designated generally in FIG. 1 as 34, comprises a plurality of pairs of pinch rolls, specifically three pairs 36, 38 and 40 of such rolls. These rolls rotate as indicated and are positively driven. In some cases the three pairs may be driven at the same speed, but ordinarily each succeeding pair in the series is driven at a slightly higher speed than the one preceding it in the series so as to maintain some longitudinal tension on the film as it passes toward the take-up roll 32. Guide rolls 42, 44 and 46 and a pair 48 of guide rolls are provided to guide the film from the aforementioned pinch rolls to the take-up roll 32.

Before and/or after passing between the pinch rolls the gelled film is treated, specifically washed, to remove the excess liquid coagulant from the film, and specifically to remove excess sulfuric acid when the coagulating fluid is aqueous $H_2SO_4$. Washing may be effected by applying sprays of the same or different treating or wash fluids from spray means such as sprays 50, 52, 54, 56, 58, 60, 62 and 64.

The wash fluid may be water alone or a combination of water and other wash fluids in different permutations. For example, an initial wash with water may be followed at the second station by an alkaline wash (e.g., an aqueous solution of sodium or potassium carbonate or bicarbonate) followed by another water wash at the third station; or the alkaline wash may be applied first followed by a water wash and then by a wash with a more volatile wash fluid than water, e.g., acetone, methanol, ethanol or the like. Instead of using three stations as indicated in FIG. 1 any desired or required number of stations could be employed, e.g., 4 through 10 stations, or more, if necessary.

Washing rolls or reels that are angularly disposed or skewed so that the film continuously advances over the surface of the roll or reel can be used when the film is sufficiently narrow that it is practical to cause it to advance in a helical path over the surfaces of such devices. Or, a series of wash troughs or vessels through which the film passes, preferably countercurrently to the flow of the wash fluid, can be employed in place of the washing means illustrated in FIG. 1.

The washed, gelled film 66 from which the excess coagulant has been removed is then dried by any suitable means either before or after it is taken up on roll 32. In many cases passage of the film through air at room temperature causes the film to dry sufficiently for take-up (without sticking of contacting layers on the roll), especially if a volatile solvent such as acetone or methanol has been applied as a final wash before take-up, and the time of exposure to air has been sufficiently long to volatilize substantially all of the solvent.

FIG. 1 shows no positive drying of the washed, gelled film 66, and illustrates only air drying of the film before take-up. However, if desired, the film could be passed through a drying zone such as a heated oven while held on a support, or preferably by passage over the warm or hot (up to about 130° C.) surfaces of a heated roll. Drying at an elevated temperature is preferably done in a non-oxidizing atmosphere, e.g., argon, helium, nitrogen, etc.

Referring now to FIG. 2, which illustrates schematically another embodiment of the invention, a wet gelled film is initially formed in essentially the same manner as has been described hereinbefore with reference to FIG. 1, with the exception that variations may be made in the composition of the coagulating bath, specifically in the concentration of $H_2SO_4$ in the said bath, as heretofore has been described.

As there shown a polymer-containing, film-forming solution or dope, such as previously has been described, enters the extrusion head 68 from a supply source (not shown). It is forced under pressure through a slot (not shown) in the extrusion head, forming the gelled film 70 when the dope contacts the liquid coagulant 72 in the vessel 74.

The liquid coagulant employed may be the same as liquid coagulant 22 in FIG. 1 except that, in this embodiment of the invention, when the coagulant is aqueous sulfuric acid its concentration of $H_2SO_4$ should be below 54 weight percent thereof and preferably not higher than (i.e., not substantially exceeding) about 50% by weight of the liquid coagulant. Temperature and other bath conditions and operations including the positioning of rods or pins 76 and 78, which correspond to rods or pins 28 and 30, respectively, that are shown in FIG. 1, may be the same (as desired or as conditions may require) as those previously set forth in describing the present invention with reference to FIG. 1.

In the embodiment of the invention illustrated in FIG. 2, unlike the embodiment illustrated in FIG. 1, it is not essential that tensioning means such as rods or pins 76 and 78 be present in the coagulating bath and be positioned so as to cause the gelled film 70 to so reverse its direction that its angle of bend is at least about 135°, more particularly within the range of from about 135° to about 225°, or higher. Instead, other (or additional, if rods 76 and 78 are present) physical means, hereafter described, may be employed to modify the characteristics of the gelled film so that a transparent film is obtained after the polymer has been dried.

In either case (i.e., in the presence or absence of the aforementioned tensioning means in the coagulating bath) the gelled film is removed from the bath and led over the film-advancing device 80, e.g., skewed rolls comprised of upper roll 82 and lower roll 84. These rolls converge or are skewed so that the film follows a helical path as it moves along the surfaces of the rolls. The rolls are positively driven by drive means (not shown) at the same rate of rotation, this rate being sufficient to maintain the film under slight tension.

If rods 76 and 78 are present in the liquid coagulant, the gelled film may be removed from the bath and led to the take-on end of the film-advancing device 80 as indicated in FIG. 1. However, if rods 76 and 78 or equivalent tensioning means have been omitted from the coagulating bath, then the gelled film may be passed directly from the coagulating bath to the film-advancing device, either with or without passing over one or more godets or idler rolls that serve to guide the film in passing from an exit point, e.g., at or near one end of the coagulating bath, to the aforesaid film-advancing device.

As the film travels over the device 80, it is treated with a treating fluid, more particularly aqueous sulfuric acid having a concentration of $H_2SO_4$ higher than that of the coagulating bath but less than that which effects dissolution (or incipient dissolution) of the gelled film of polymer. For example, the gelled film may be treated with a concentration of $H_2SO_4$ within the range of from 54 to 58%, preferably from 55 to 57%, by weight thereof. The temperature of the aqueous sulfuric acid when applied to the advancing film on the skewed rolls may be varied considerably, e.g., from about 40° to about 100° C.

The aqueous sulfuric acid 86 may be applied to the gelled film as it advances over the device 80 by any suitable means; for example, it may be sprayed or allowed to drip over said film from spray 88 or an equivalent device such as a header having attached thereto an elongated arm provided with a plurality of openings therein along its length, said arm extending along all or part of the length of the upper roll of the device 80. The sulfuric acid draining off the device is collected in collection reservoir 90.

Instead of the technique illustrated in FIG. 2 for treating the gelled film with aqueous sulfuric acid of the specified concentration, one may use any other suitable technique, e.g., the method illustrated in FIG. 1 in applying a washing fluid; or one may immerse the gelled film in a bath or series of baths of aqueous sulfuric acid of the specified concentration after withdrawing the gelled film from the coagulating bath.

In any of the foregoing procedures the contact time of the gelled film with the 54–58% $H_2SO_4$ may range, for example, from about ½ minute to about 1 hour or more, more particularly from about 1 to about 10 minutes. The use of shorter or longer periods of time is not precluded. When the solvent in which the polymer is dissolved is other than sulfuric acid, examples of which have been given hereinbefore, an amount of such other solvent in a concentration equivalent to that obtained with 54–58% $H_2SO_4$ may be employed instead of said sulfuric acid of said 54–58% $H_2SO_4$ concentration.

The treated film, more particularly the sulfuric acid-treated gelled film, is then contacted with glacial acetic acid, for example by passing it through a bath 98 of such acid in liquid state, more particularly at a temperature ranging from about 30° C. to 100° C., or even near the B.P. of the said acetic acid. The speed of rotation of the take-up roll 100 is such that the time of immersion of the gelled film in the glacial acetic acid bath 98 ranges, for example, from ½ minute to 1 hour or more, more particularly from about 1 to about 10 minutes. The use of shorter or longer periods of time is not precluded. Suitable guide rolls are provided for moving the gelled film into and out of the glacial acetic acid bath, and thence into and out of a bath of washing fluid 102, specifically water.

The combination of the 54–58% $H_2SO_4$ treatment and the glacial acetic acid treatment surprisingly and unobviously makes possible the production of a transparent film. The sulfuric acid seemingly acts as a slow or partial solvent or swelling agent for the polymer film while the glacial acetic acid perhaps functions somewhat like a "washing" agent which seems to be specific in this application or use. Other washing agents such as water, methanol and acetone are not the equivalent of glacial acetic acid, since when one employs such other agents instead of glacial acetic acid, a non-transparent film is obtained.

In this connection it may be noted that a treatment with water immediately following the aforementioned $H_2SO_4$ treatment produces an opaque film. The treatment of the film, e.g., by immersion in glacial acetic acid, after treatment with 54–58% $H_2SO_4$ or equivalent treatment, assures desolvation of the gelled film under conditions suitable for preserving the transparency of the sulfuric acid-laden film upon washing and drying.

Instead of a treating fluid 86 comprising aqueous sulfuric acid of the kind hereinbefore specifically described with particular reference to the treatment of the gelled film 84, one may use a more dilute aqueous solution of any other compound of which a more concentrated solution is employed to dissolve the polymer and form a solution of the polymer that yields a shaped, gelled film when the said solution is extruded into the liquid coagulant.

After being washed free of acetic acid by immersion in the washing-fluid bath, or by any other suitable means such as those mentioned hereinbefore with regard to the application of washing and other treating fluids, the washed film is dried or is allowed to dry as has been previously described with reference to the embodiment of the invention illustrated in FIG. 1. In the embodiment illustrated in FIG. 2 the length of travel of the washed film after leaving the bath of washing fluid 102 up to the take-up on the roll 100 is such that the film air-dries sufficiently so that it can be taken up on the roll without sticking together of contacting layers.

The transparency of the film produced by the embodiment of the invention illustrated in FIG. 2 is substantially the same as that obtained by practicing the previously described embodiment of the invention illustrated in FIG. 1.

In order that those skilled in the art may better understand how the present invention can be carried into effect, the following examples are given by way of illustration and not by way of limitation. All parts and percentages are by weight unless otherwise stated.

Example 1

An extrudable solution, having a Synchro-Electric viscosity of 25° C. of 3800 poises, is made from the following:

| | Parts |
|---|---|
| Polyhexamethylene terephthalamide | 11.6 |
| Sulfuric acid (96% $H_2SO_4$) | 82.2 |
| Ammonium sulfate | 6.2 |

The ammonium sulfate is added to the concentrated sulfuric acid at room temperature (20°–30° C.), and the mixture is stirred at the same temperature until the ammonium sulfate goes into solution. The polyhexamethylene terephthalamide in finely divided state is added to, and admixed with, the solution of ammonium sulfate in the sulfuric acid. Mixing is effected at about 40°–50° C., and is continued until the polymer has substantially completely dissolved, e.g., for about 2 hours. The aforementioned solution has the aforesaid viscosity of 3800 poises at 25° C. The polymer component thereof has an inherent viscosity (I.V.) of 1.8 measured as a solution of 0.4 gram of polymer per deciliter of concentrated sulfuric acid solvent at 25° C.

The foregoing solution is extruded through a horizontal slot 51 mm. wide and 0.18 mm. high into a coagulation bath of 43% $H_2SO_4$ in water at 50° C. At a distance in the bath of 63 inches from the slot, the horizontal band is snubbed 180° over a pair of smooth-surfaced ceramic rods positioned below the surface of the bath, e.g., as illustrated in FIG. 1. (As has been previously pointed out, when a band, yarn or the like is caused to reverse its direction twice, this corresponds to an angle of bend of 180°; that is, the yarn or band has been "snubbed" 180°.) The band is withdrawn from the coagulating bath at a distance of 68 inches from the slot.

After leaving the bath, the band is passed over an advancing set of wash rolls where it is rinsed by a cascade of hot water. It is then passed to take-up mechanism where it is wound at, for example, 15–30 meters/minute, more particularly at 15–22.5 meters/minute. The wound material is washed free of acid, e.g., by immersion for about 16 hours in a water bath wherein the water is continuously replenished with fresh water. The washed band is air-dried at room temperature.

When additional constraint is not applied, the thin bands tend to roll into loose coils through the action of surface tension of the entrained liquid. When extension and coagulation are carried out as described above, the loosely-coiled bands are easily unwound after washing and drying.

The dried film is about 2 cm. in width. It has a tensile strength above 15,000 pounds per square inch, a calculated average thickness of 3–4 microns, and a transparency such that there is no difficulty in reading typed or printed material through it.

Example 2

Example 1 is repeated with the exception that there is used an extrusion slot 3 inches wide instead of 51 mm. wide as in Example 1. The dried film is 3.5 cm. wide, while its tensile strength, average thickness and transparency are approximately the same as that of the dried film of Example 1.

Example 3

The same solution of polymer employed in Examples 1 and 2 is extruded into a coagulation bath of aqueous sulfuric acid at 50° C. and which contains only about 12% $H_2SO_4$. The coagulated material comprises opaque bands that can be taken up at speeds considerably below 10 meters per minute. A portion of one of these bands, having a thickness of about 30 microns and a tensile strength of about 5900 pounds per square inch is immersed for 3 minutes in aqueous 57% $H_2SO_4$, then in glacial acetic acid, and is finally washed free of acid with water, treated with acetone, and dried. The dried film has substantially the same transparency of clarity as those resulting from the procedures of Examples 1 and 2.

Example 4

Example 1 is repeated with the exception that, instead of washing the gelled film with hot water on an advancing set of washing rolls it is treated on said rolls with aqueous sulfuric acid containing 56% $H_2SO_4$ at a temperature of about 50° C. The rate of travel of the film over the rolls is such that it is contacted with the $H_2SO_4$ for about 2 minutes. The sulfuric acid-treated gelled film is then immersed in glacial acetic acid at 50° C. for 3 minutes, washed free of acetic acid with water, given a final wash with acetone, and then allowed to air-dry.

The dried film is transparent.

For effective clarification (i.e., rendering transparent) of otherwise opaque films, the acetic acid treatment, as by immersion, must follow directly after the treatment with 54–58%, e.g., 56–57%, $H_2SO_4$ solution.

The films of the present invention may be produced in any desired thickness, e.g., in thicknesses ranging from 1 to 250 microns. They may be biaxially oriented in known manner if desired, thereby increasing their overall tensile strength. Although the method is particularly applicable in producing transparent films, the process is useful in producing translucent, opaque or colored films by, for example, introducing opacifiers or coloring agents into the extrudable dope.

It is to be understood that the foregoing detailed description is given merely by way of illustration and that many variations may be made therein without departing from the spirit of the invention.

The embodiments of the invention in which an exclusive property or privilege is claimed are defined as follows:

1. The method of forming a film from a difficultly-meltable, sulfuric acid - soluble, film - forming polymer which comprises:
   (A) extruding a solvent solution of the said polymer through a slotted opening into a liquid coagulating bath in which the said polymer is insoluble thereby to from a gelled film of the said polymer, which film is normally at least partly non-transparent after drying,
      the solvent in which the said polymer is dissolved being sulfuric acid containing at least 70% by weight of $H_2SO_4$, and
      the liquid coagulating bath into which the said solvent is extruded being an aqueous liquid containing from 0 to 50% by weight of $H_2SO_4$;
   (B) removing the gelled film from the said liquid coagulating bath;
   (C) treating the gelled film, after removal from the cogulating bath, with aqueous sulfuric acid having a concentration of $H_2SO_4$ within the range of from 54 to 58% by weight thereof;
   (D) treating the gelled film from step C with glacial acetic acid; and
   (E) removing the excess acetic acid from the glacial acetic acid-treated film of step D.

2. The method as in claim 1 wherein the polymer is a difficultly - meltable film - forming condensation polymer having repeating amide groups as an integral part of the polymer chain.

3. The method as in claim 2 wherein the condensation polymer is a poly(polymethylene)terephthalamide.

4. The method as in claim 3 wherein the poly(polymethylene)terephthalamide is polyhexamethylene terephthalamide.

5. The method as in claim 1 wherein the solvent in which the polymer is dissolved is sulfuric acid containing at least 75% by weight of $H_2SO_4$.

6. The method of forming a transparent film from a condensation polymer having repeating amide groups as part of the polymer molecule, said method comprising:
   (A) extruding a solvent solution of the said polymer through a slotted opening into a liquid coagulating bath in which the said polymer is insoluble thereby to form a gelled film of the said polymer, which film normally is at least partly non-transparent after drying,
      the solvent in which the said polymer is dissolved being sulfuric acid containing at least 75% by weight of $H_2SO_4$, and
      the liquid coagulating bath into which the said solvent solution is extruded being aqueous sulfuric acid having a concentration of $H_2SO_4$ within the range of from 20 to 50% by weight of the said liquid bath, which is at a temperature within the range of from 20° C. to about 100° C.;
   (B) removing the gelled film from the said liquid coagulating bath;
   (C) treating the gelled film, after removal from the coagulating bath, with aqueous sulfuric acid having a concentration of $H_2SO_4$ within the range of from 54 to 58% by weight thereof;
   (D) treating the gelled film from step C with glacial acetic acid;
   (E) removing excess acetic acid from the glacial acetic acid-treated film of step D by treatment with a washing fluid; and
   (F) drying the resulting film.

7. The method as in claim 6 wherein the condensation polymer is a poly(polymethylene)terephthalamide, the liquid coagulating bath has a concentration of $H_2SO_4$ ranging from 35 to 50% by weight thereof, and the aqueous sulfuric acid used in step C for treating the gelled film has a concentration of $H_2SO_4$ within the range of from 55 to 57% by weight thereof.

8. A method as in claim 7 wherein the poly(polymethylene)terephthalamide is polyhexamethylene terephthalamide, and the said aqueous sulfuric acid is applied to the said gelled film at a temperature ranging between 40° C. and 100° C.

9. The method of forming a transparent film from a condensation polymer having repeating amide units as part of the polymer molecule, said method comprising:
   (A) extruding a solvent solution of the said polymer through a slotted opening into a liquid coagulating bath in which the said polymer is insoluble thereby to form a gelled film of the said polymer, which film normally is at least partly non-transparent after drying, the solvent in which the said polymer is dissolved being sulfuric acid containing at least 75% by weight of $H_2SO_4$, and the liquid coagulating bath into which the said solvent solution is extruded being an aqueous liquid containing from 0 to 50% by weight of $H_2SO_4$;

(B) causing the gelled film while in the coagulating bath and in contact with smooth curved surfaces to so reverse its direction that its angle of bend is at least about 135°;

(C) removing the gelled film from the coagulating bath after its initial direction has been reversed as specified in step B, and treating the gelled film with aqueous sulfuric acid having a concentration of sulfuric acid within the range of from 54 to 58% by weight thereof;

(D) washing excess sulfuric acid from the gelled film; and (E) drying the resulting film.

10. The method as in claim 9 wherein the condensation polymer is a poly(polymethylene)terephthalamide, and the liquid coagulating bath has a concentration of $H_2SO_4$ ranging from 30 to 50% by weight thereof.

11. The method as in claim 10 wherein the poly(polymethylene)terephthalamide is polyhexamethylene terephthalamide.

12. The method as in claim 9 wherein, in step B, the gelled film is caused to so reverse its direction that its angle of bend is approximately 180°.

References Cited

UNITED STATES PATENTS 3,154,609 10/1964 Cipriani _____ 264—184
3,227,793 1/1966 Cipriani _____ 264—203

ROBERT F. WHITE, *Primary Examiner.*

G. AUVILLE, *Assistant Examiner.*